(12) United States Patent
Yoon et al.

(10) Patent No.: US 12,267,549 B2
(45) Date of Patent: Apr. 1, 2025

(54) DISPLAY DEVICE AND METHOD OF CONTROLLING THE SAME

(71) Applicant: SAMSUNG ELECTRONICS CO., LTD., Suwon-si (KR)

(72) Inventors: Eungsik Yoon, Suwon-si (KR); Hyunkyu Yun, Suwon-si (KR); Heeseok Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 17/963,891

(22) Filed: Oct. 11, 2022

(65) Prior Publication Data

US 2023/0063642 A1 Mar. 2, 2023

Related U.S. Application Data

(63) Continuation of application No. PCT/KR2022/011351, filed on Aug. 2, 2022.

(30) Foreign Application Priority Data

Sep. 1, 2021 (KR) ........................ 10-2021-0116049

(51) Int. Cl.
*H04N 21/443* (2011.01)
*H04N 21/426* (2011.01)
*H04N 21/442* (2011.01)

(52) U.S. Cl.
CPC ....... *H04N 21/426* (2013.01); *H04N 21/4424* (2013.01); *H04N 21/443* (2013.01); *H04N 21/4436* (2013.01)

(58) Field of Classification Search
CPC ............. H04N 21/443; H04N 21/4436; H04N 21/4424
See application file for complete search history.

(56) References Cited

U.S. PATENT DOCUMENTS

| 10,291,460 B2 | 5/2019 | Zhang et al. |
| 2008/0181095 A1 | 7/2008 | Zangi |

(Continued)

FOREIGN PATENT DOCUMENTS

| JP | 2018-155974 | 10/2018 |
| JP | 2020-144115 | 9/2020 |

(Continued)

OTHER PUBLICATIONS

Search Report dated Nov. 4, 2022 issued in International Patent Application No. PCT/KR2022/011351.

(Continued)

*Primary Examiner* — Pinkal R Chokshi
(74) *Attorney, Agent, or Firm* — Nixon & Vanderhye P.C.

(57) ABSTRACT

A display device and a method of controlling the same are provided. The display device may include: a memory comprising one or more executable instructions, and a processor configured to execute the one or more instructions stored in the memory, wherein the processor may be configured to: monitor a use state of the display device, based on at least one of an individual usage indicator configured for a current viewing mode among a plurality of viewing modes of the display device, and a universal usage indicator configured to be used for the plurality of viewing modes identify a current power saving level among a plurality of power saving levels of a phased power saving mode of the display device determine a next power saving level based on the use state and the current power saving level, and apply the next power saving level to the display device.

20 Claims, 10 Drawing Sheets

(56) References Cited

U.S. PATENT DOCUMENTS

| | | |
|---|---|---|
| 2010/0295839 A1* | 11/2010 | Nagaya .................... H04N 5/63 |
| | | 345/212 |
| 2017/0010654 A1 | 1/2017 | Chen |
| 2017/0026700 A1 | 1/2017 | Choi et al. |
| 2018/0143677 A1* | 5/2018 | Gelonese ................. H04Q 9/00 |
| 2019/0064552 A1* | 2/2019 | Kim ..................... H10K 59/122 |
| 2019/0074985 A1* | 3/2019 | Higuchi ............. H04N 21/4424 |
| 2019/0327124 A1* | 10/2019 | Lai .......................... G01S 5/017 |
| 2019/0364335 A1* | 11/2019 | Sato ........................ H04N 5/63 |
| 2019/0387192 A1* | 12/2019 | Fang ................. H04N 21/4432 |
| 2021/0091866 A1* | 3/2021 | Zhang .................. H04B 17/309 |
| 2022/0167455 A1* | 5/2022 | Marchand ............. H04W 76/20 |
| 2023/0036682 A1* | 2/2023 | Alvarez ............. H04N 21/4122 |

FOREIGN PATENT DOCUMENTS

| KR | 10-2004-0089299 | 10/2004 |
|---|---|---|
| KR | 10-2006-0120342 | 11/2006 |
| KR | 10-2010-0124390 | 11/2010 |
| KR | 10-2011-0019795 | 3/2011 |
| KR | 10-1716732 | 3/2017 |
| KR | 10-2020-0099265 | 8/2020 |

OTHER PUBLICATIONS

Extended European Search Report dated Oct. 1, 2024 for EP Application No. 22864886.1.

* cited by examiner ations No. PCT/KR2022/011351 designating the United
DISPLAY DEVICE AND METHOD OF CONTROLLING THE SAME

CROSS-REFERENCE TO RELATED APPLICATIONS

This application is a continuation of International Application No. PCT/KR2022/011351 designating the United States, filed on Aug. 2, 2022, in the Korean Intellectual Property Receiving Office and claiming priority to Korean Patent Application No. 10-2021-0116049, filed on Sep. 1, 2021, in the Korean Intellectual Property Office, the disclosures of which are incorporated by reference herein in their entireties.

BACKGROUND

1. Field

The disclosure relates to a display device and method of controlling the same.

2. Description of Related Art

A display device may provide multimedia content to a user. The display device may display an image using various types of display panels. For example, the display device may include a light-emitting diode (LED) panel, an organic LED (OLED) panel, and a liquid crystal display (LCD) panel. Recently, a display device may provide various network environments, such as wired Ethernet, a wireless local area network (LAN), and Bluetooth. A user of the display device may connect to the Internet or may connect the display device to a surrounding device of the display device.

SUMMARY

According to various example embodiments, a display device includes: a memory including one or more executable instructions, and a processor configured to execute the one or more instructions stored in the memory, wherein the processor may be configured to: monitor a use state of the display device, based on at least one of an individual usage indicator configured for a current viewing mode among a plurality of viewing modes of the display device, and a universal usage indicator configured to be used for the plurality of viewing modes, identify a current power saving level among a plurality of power saving levels of a phased power saving mode of the display device, determine a next power saving level based on the use state and the current power saving level, and apply the next power saving level to the display device.

According to various example embodiments, a display device includes: a memory including one or more executable instructions, and a processor configured to execute the one or more instructions stored in the memory, wherein the processor may be configured to: monitor a use state of the display device based, on at least one of an individual usage indicator configured for a current viewing mode among a plurality of viewing modes of the display device, and a universal usage indicator configured to be used for the plurality of viewing modes, identify a current power saving level among a plurality of power saving levels of a phased power saving mode of the display device, determine a next power saving level to be one level higher than the current power saving level based on use by the user not being detected for a specified time, based on the use state, and apply the next power saving level to the display device, wherein, among the plurality of power saving levels, as the level increases, less power may be consumed.

According to various example embodiments, a method of controlling a display device is provided, the method includes: monitoring a use state of the display device, based on at least one of an individual usage indicator configured for a current viewing mode among a plurality of viewing modes of the display device, and a universal usage indicator configured to be used for the plurality of viewing modes, identifying a current power saving level among a plurality of power saving levels of a phased power saving mode of the display device, determining a next power saving level based on the use state and the current power saving level, and applying the next power saving level to the display device.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
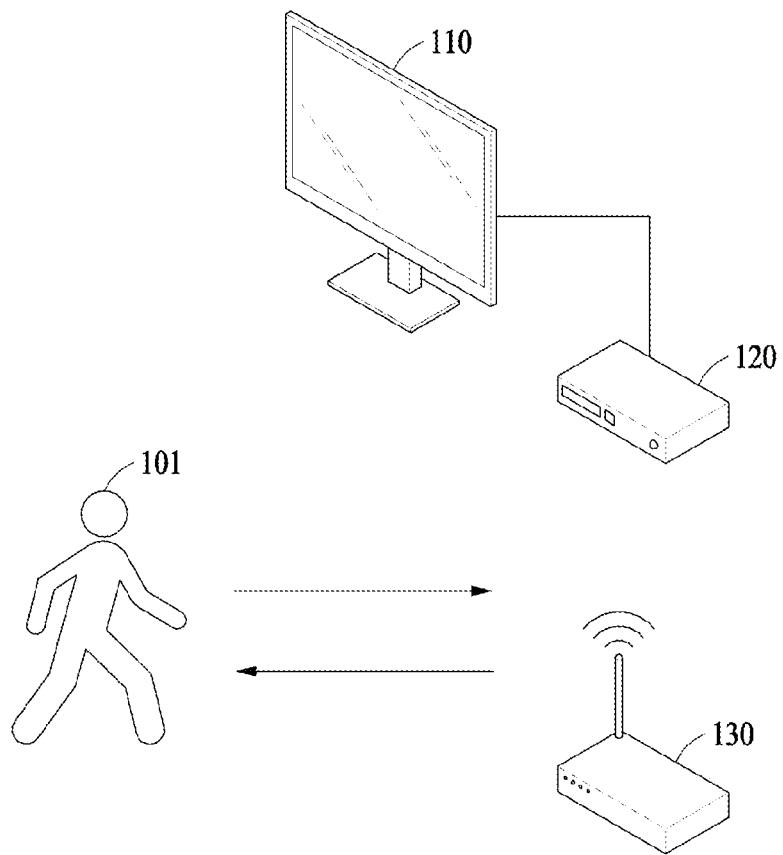
FIG. 1 is a diagram illustrating an example of an operating environment of a display device according to various embodiments.

Hereinafter, various example embodiments will be described in greater detail with reference to the accompanying drawings. When describing the example embodiments with reference to the accompanying drawings, like reference numerals refer to like elements and a repeated description related thereto may not be provided.

When a display device is not in use but still in operation, unnecessary power consumption may occur.

According to various example embodiments, a display device may minimize and/or reduce power consumption by controlling a power mode of the display device based on a use state of the display device.

FIG. 1 is a diagram illustrating an example of an operating environment of a display device according to various embodiments. Referring to FIG. 1, a user 101 may watch multimedia content on a display device 110. The display device 110 may monitor a use state of the display device 110, based on a usage indicator of the display device 110. The usage indicator may provide a clue (or indication) that indicates whether the user 101 uses the display device 110. For example, the user's 101 control of a remote controller of the display device 110 or a motion around the display device 110 may indicate that the user 101 uses the display device 110.

The usage indicator may include an individual usage indicator specialized in a predetermined environment and a universal usage indicator commonly used in various environments. For example, the display device 110 may provide various viewing modes, and an individual usage indicator suitable for each viewing mode may be defined. For example, the viewing modes may include a first viewing mode using a remote controller of the display device 110 and a second viewing mode using a remote controller of an external multimedia device 120 that provides multimedia content to the display device 110. When a current viewing mode is the first viewing mode, a signal of the remote controller of the display device 110 may be used as the usage indicator, and when a current viewing mode is the second viewing mode, a signal of the remote controller of the external multimedia device 120 may be used as the usage indicator.

The universal usage indicator may include at least one of sound around the display device 110, a display status of a menu of the display device 110, and a channel status between the display device 110 and a wireless router 130. For example, sound, which is detected around the display device 110, related to the user 101 may be regarded as an indicator indicating that the user 101 uses the display device 110. In addition, a state in which the same menu keeps being displayed on the display device 110 for a long time may be regarded as an indicator indicating that the user 101 does not use the display device 110. In addition, a motion of the user 101 around the display device 110 may be regarded as an indicator indicating that the user 101 uses the display device 110. The motion of the user 101 may be measured based on multipath channel characteristic data. The multipath channel characteristic data may represent a channel status characteristic of a multipath. For example, the multipath channel characteristic data may include channel status information (CSI) data. The universal usage indicator may be used regardless of the current viewing mode.

The display device 110 may set an operation mode of the display device 110, based on a use state of the display device 110. The operation mode may include a normal mode and a power saving mode. The normal mode may provide a necessary function for watching without limitation, and the power saving mode may limit some necessary watching functions. The display device 110 may provide a phased power saving mode including a plurality of power saving levels. For example, the power saving levels may include a first power saving level using a lower screen brightness, compared to the normal mode, a second power saving level turning off a screen only between the screen and sound, a third power saving level turning off both the screen and the sound, and a fourth power saving level shutting off the power. However, a type of the power saving levels is not limited thereto, and at least some of the power saving levels may be omitted, or another power saving level may be additionally provided.

The display device 110 may determine a next power saving level from the plurality of power saving levels, based on a current power saving level and the use state of the display device 110, and may apply the next power saving level to the display device 110. When use by the user 101 is not detected for a predetermined time, based on the use state, the display device 110 may set the next power saving level to be one level higher than the current power saving level. When using multiple usage indicators, all of the multiple usage indicators may need to indicate non-use to determine that the user does not use the display device 110. With respect to the plurality of power saving levels, it may be defined that a higher level consumes less power than a lower level. The display device 110 may gradually reduce power consumption by increasing the power saving level. On the other hand, when the use by the user 101 is detected based on the use state, the display device 110 may release the power saving mode and may enter the normal mode regardless of a level of the current power saving level. A phased increase of the power saving level and a simultaneous release of the power saving mode may improve user convenience.

Figure 2:
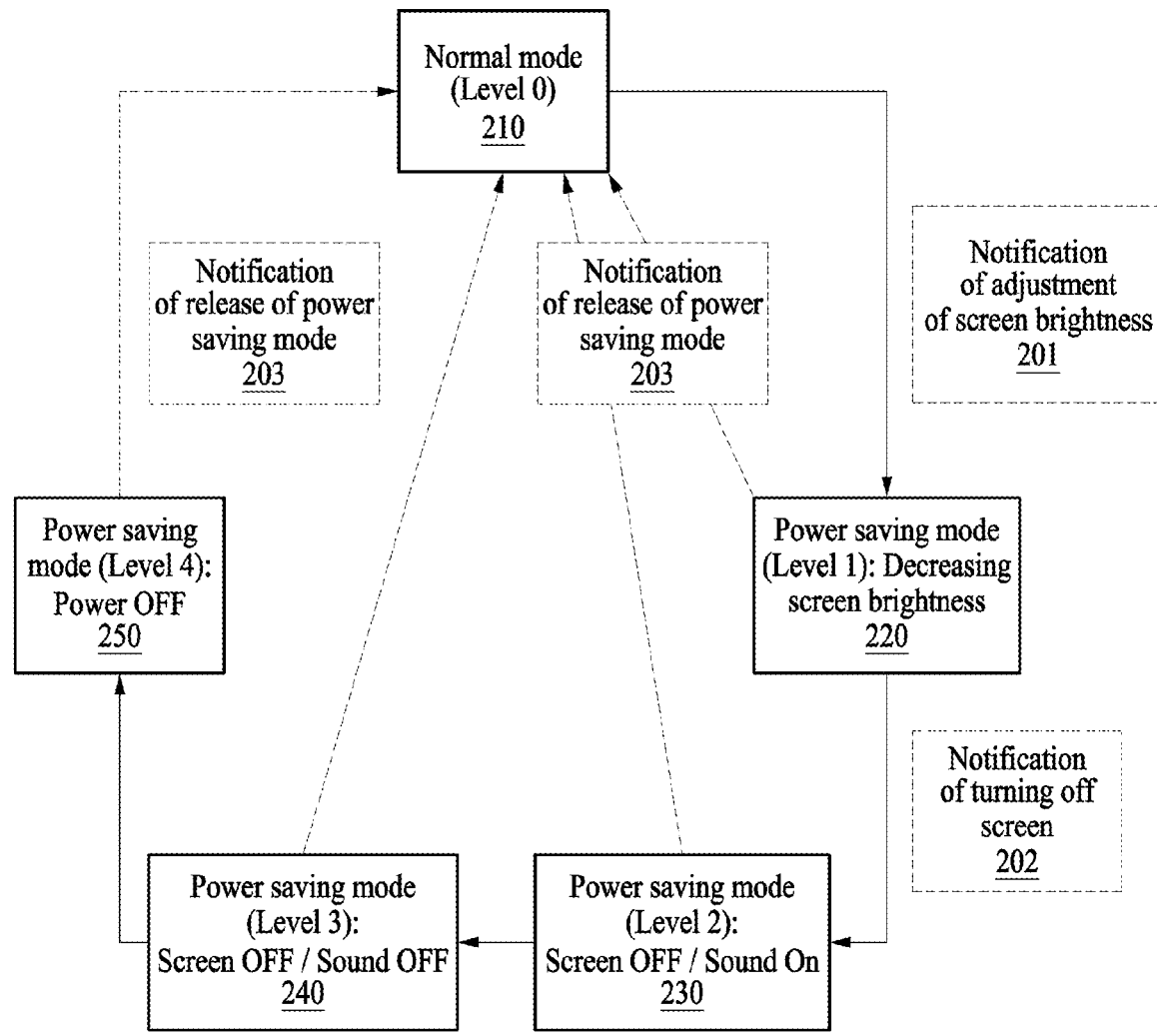
FIG. 2 is a diagram illustrating an example relationship between operation modes of a display device according to various embodiments.

FIG. 2 is a diagram illustrating an example relationship between operation modes of a display device according to various embodiments. Referring to FIG. 2, an operation mode of a display device (for example, the display device 110, a display device 900 (refer to FIG. 9), and a display device 1000 (refer to FIG. 10)) may include a normal mode 210 and power saving modes 220, 230, 24 and 250 (which may be referred to as power saving modes 220 to 250). The power saving modes 220 to 250 may have levels, respectively. The higher the level, more functions may be limited and less power may be consumed. The normal mode 210 may correspond to a level 0. FIG. 2 illustrates the power saving modes 220 to 250 at levels 1 to 4, however, the number of levels is not limited thereto, and a different number of levels may be used.

The display device may monitor a use state of the display device, based on a usage indicator. As a result of monitoring, when a non-use state is continued for a predetermined time, the display device may apply the power saving modes 220 to 250 in phases. When using multiple usage indicators, all of the multiple usage indicators may need to indicate non-use to determine that the user does not use the display device. On the other hand, when the use by the user is detected, the display device may set the operation mode to the normal mode 210 regardless of the current power saving level. In FIG. 2, a solid arrow may indicate phased applying of the power saving modes 220 to 250, and a dashed arrow may indicate entering the normal mode 210 due to the release of the power saving mode.

The display device may determine a next power saving level based on the use state of the display device and the current power saving level. When the non-use state continues in the normal mode 210, the power saving mode 220 at level 1 may be applied, and thereafter, the non-use state continues further, the power saving mode 230 at level 2 may be applied. Next, the power saving mode 240 at level 3 and the power saving mode 250 at level 4 may be sequentially applied. For example, a lower screen brightness may apply to the display device, compared to the normal mode at level 1, only a screen of the display device may be turned off at level 2, both the screen and sound of the display device may be turned off at level 3, and the power of the display device may be turned off at level 4.

When the level changes, the display device may display notification messages 201 and 202 for the next power saving level. For example, when the level has changed from level 0 to level 1, the notification message 201 that informs screen brightness adjustment may be displayed. For example, the notification message 201 may include text, such as "Entering the power saving mode phase 1 (reducing screen brightness) soon, since no user activity is detected." When the level is to change from level 1 to level 2, the notification message 202 that informs turning off the screen may be displayed. For example, the notification message 202 may include text, such as "Entering the power saving mode phase 2 (turning off the screen) soon, since user activity is not detected continuously."

When the level is to change from level 2 to level 3, or from level 3 to level 4, a message may not be displayed since the screen of the display device is already turned off. However, a voice message, such as "Entering the power saving mode phase 3 soon since user activity is not continuously detected, and the screen and sound will turn off." or "Entering the power saving mode phase 4 soon since user activity is not continuously detected, and the power will turn off." may be output. In the power saving mode 240 at level 3, a state in which the sound is turned off may be a state in which sound of multimedia content is not output, and the voice message may be output regardless of turning off the sound.

When the use state of the user is detected, the display device may set the operation mode to the normal mode 210 regardless of the current power saving level. For example, the use state of the user may be detected through a user input to a remote controller. A type of the user input required for detecting the use state may vary depending on the power saving level. As the level increases, a more decisive input may be required. For example, the power saving mode may be released by all user inputs to the remote controller at level 1 and level 2, and the power saving mode may be released by a user input on a power button of the remote controller at level 3 and level 4.

The display device may display a notification message 203 on the release of the power saving mode when entering the normal mode 210. For example, the notification message 203 may include text, such as "the power saving mode is released as user activity is detected." The notification message 203 may be equally applied regardless of a level of the power saving mode before entering the normal mode 210.

The display device may monitor a use state of the display device using a usage indicator, based on a use environment. The usage indicator may include an individual usage indicator specialized in a predetermined environment and a universal usage indicator commonly used for various environments. For example, the display device may provide various viewing modes, and an individual usage indicator suitable for each viewing mode may be defined. For example, the viewing modes may include a first viewing mode using a remote controller of the display device and a second viewing mode using a remote controller of an external multimedia device (for example, the external multimedia device 120) that provides multimedia content to the display device.

The display device may receive multimedia content through a broadcasting function of the display device. For example, the display device may by wire or wirelessly receive a broadcast signal corresponding to the multimedia content, or may receive the multimedia content through a broadcasting application of the display device. In this case, the user may watch the multimedia content by controlling the display device using a remote controller (hereinafter, may be referred to as a first remote controller) of the display device. A viewing mode of the display device using the first remote controller may be referred to as a first viewing mode.

On the other hand, the display device may receive multimedia content from the external multimedia device. For example, the external multimedia device may include a set-top box, an over-the-top (OTT) box, and a video game console. The external multimedia device may transmit the multimedia content to the display device through an external input port (for example, a high-definition multimedia interface (HDMI) port). In this case, the user may watch the multimedia content by controlling the external multimedia device using a remote controller (hereinafter, may be referred to as a second remote controller) of the external multimedia device. The viewing mode of the display device using the second remote controller may be referred to as a second viewing mode.

When the current viewing mode is the first viewing mode, a signal of the first remote controller may be used as an individual usage indicator (hereinafter, may be referred to as a first individual usage indicator), and when the current viewing mode is the second viewing mode, a signal of the second remote controller may be used as an individual usage indicator (hereinafter, may be referred to as a second individual usage indicator). For example, the second remote controller may control the external multimedia device using an infrared ray (IR) signal, and the display device may detect a control signal of the second remote controller through IR sniffing. When an unknown IR signal is detected through IR sniffing, the display device may regard the unknown IR signal as the second individual usage indicator.

The universal usage indicator may include at least one of sound around the display device, a display status of a menu of the display device, and a channel status between the display device and a wireless router (for example, the wireless router 130). The universal usage indicator may be used for estimating a use state of the display device regardless of the current viewing mode. For example, a state in which the same menu is displayed on the display device for a long time may be regarded as an indicator indicating that the user does not use the display device. The display device may monitor the use state based on a maintenance time of a state in which the same menu keeps being displayed, where the maintenance time is calculated by analyzing a screen of the display device. When the maintenance time is greater than a threshold, the display device may be considered to be unused.

In addition, when a motion of a user around the display device is detected, the motion may be regarded as an indicator indicating that the user is using the display device. The motion of the user may be measured based on multipath channel characteristic data. The display device may retrieve the multipath channel characteristic data based on a wireless signal of the wireless router, may determine similarity values for each reference time by calculating a similarity for each time period of the multipath channel characteristic data, and may monitor a use state based on a change in the similarity values over time.

Figure 3:
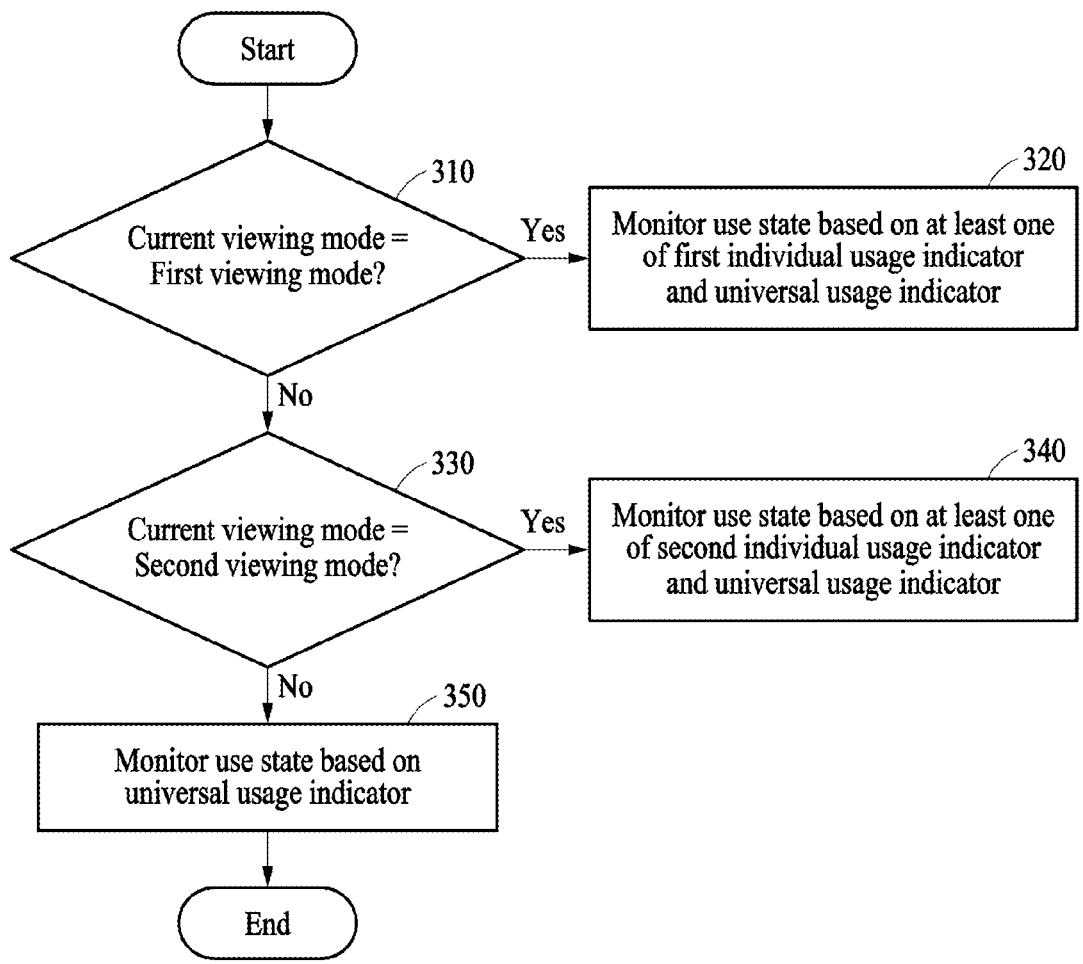
FIG. 3 is a flowchart illustrating an example operation of selecting a usage indicator, according to various embodiments.

FIG. 3 is a flowchart illustrating an example operation of selecting a usage indicator, according to various embodiments. Referring to FIG. 3, in operation 310, a display device (for example, the display device 110, the display device 900, and the display device 1000) may determine whether a current viewing mode corresponds to the first viewing mode. In case the current viewing mode corresponds to the first viewing mode, in operation 320, the display device may monitor a use state of the display device, based on at least one of the first individual usage indicator and the universal usage indicator. Here, the second individual usage indicator may be excluded. In case the current viewing mode does not correspond to the first viewing mode, in operation 330, the display device may determine whether the current viewing mode corresponds to the second viewing mode. In case the current viewing mode corresponds to the second viewing mode, in operation 340, the display device may monitor the use state of the display device, based on at least one of the second individual usage indicator and the universal usage indicator. The first individual usage indicator may be excluded. In case the current viewing mode does not correspond to the second viewing mode, in operation 350, the display device may monitor the use state of the display device based on the universal usage indicator.

Figure 4:
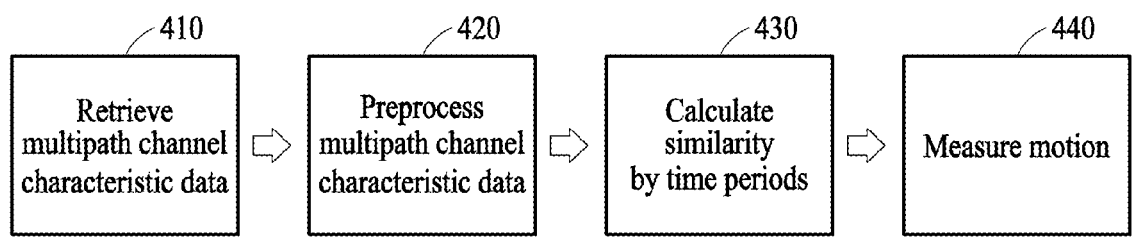
FIG. 4 is a diagram illustrating an example operation related to measuring a motion using multipath channel characteristic data, according to various embodiments.

FIG. 4 is a diagram illustrating an example operation related to measuring a motion using multipath channel characteristic data, according to various embodiments. Referring to FIG. 4, in operation 410, a display device (for example, the display device 110, the display device 900, and the display device 1000) may retrieve multipath channel characteristic data. The display device may retrieve the multipath channel characteristic data based on a wireless signal transmitted by a wireless router (for example, the wireless router 130). The wireless signal may be a wireless fidelity (Wi-Fi) signal. The multipath channel characteristic data may represent a channel frequency response by an orthogonal frequency division multiplexing (OFDM) subcarrier. The display device may retrieve the multipath channel characteristic data from a response signal of the wireless router to a response request signal of the display device, and may extract an amplitude for a frequency of each subcarrier from the multipath channel characteristic data.

In operation 420, the display device may perform preprocessing on the multipath channel characteristic data. For example, the preprocessing may include at least one of removing a data gap of a frequency, which does not have an amplitude value, among the frequencies of subcarriers, and removing an outlier from amplitude data.

In operation 430, the display device may calculate a similarity for each time period of the multipath channel characteristic data based on amplitude data for each frequency of a subcarrier based on the multipath channel characteristic data. The multipath channel characteristic data may be divided by time periods, and the similarity by the time periods may represent a similarity between multipath channel characteristic data of adjacent periods. For example, the similarity by the time periods may include an autocorrelation function (ACF). In case the preprocessing is performed through operation 420, the display device may calculate a similarity based on a result of the preprocessing. The display device may determine representative similarity values for each reference time through a similarity calculation. Here, the reference time may correspond to one of sampling time points (for example, a time point when a response signal is received) of the multipath channel characteristic data.

For example, the display device may determine a first similarity value of a first frequency at a W+1-th time point by calculating a similarity between first amplitude data of the first frequency at a first time point to a W-th time point within a first window and second amplitude data of the first frequency at a second time point to the W+1-th time point within a second window. The display device may determine similarity values of other frequencies, such as a second frequency, in a similar manner. The display device may determine a representative similarity value at the W+1-th time point, based on similarity values including the first similarity value of the first frequency at the W+1-th time point and a second similarity value of the second frequency at the W+1-th time point. For example, the representative similarity value may correspond to a statistical value (for example, an average value) of the similarity values. The display device may determine representative similarity values at other time points, such as a W+2-th time point, in a similar manner In operation 440, the display device may measure a motion around the display device.

The display device may measure the motion based on a comparison result between the representative similarity values and a threshold. For example, the display device may determine that there is a motion in a period in which the representative similarity value is greater than the threshold, and may determine that there is no motion in a period in which the representative similarity value is less than the threshold. The display device may adaptively adjust the threshold based on a distribution of the representative similarity values. The display device may use the measured motion as the usage indicator.

Figure 5:
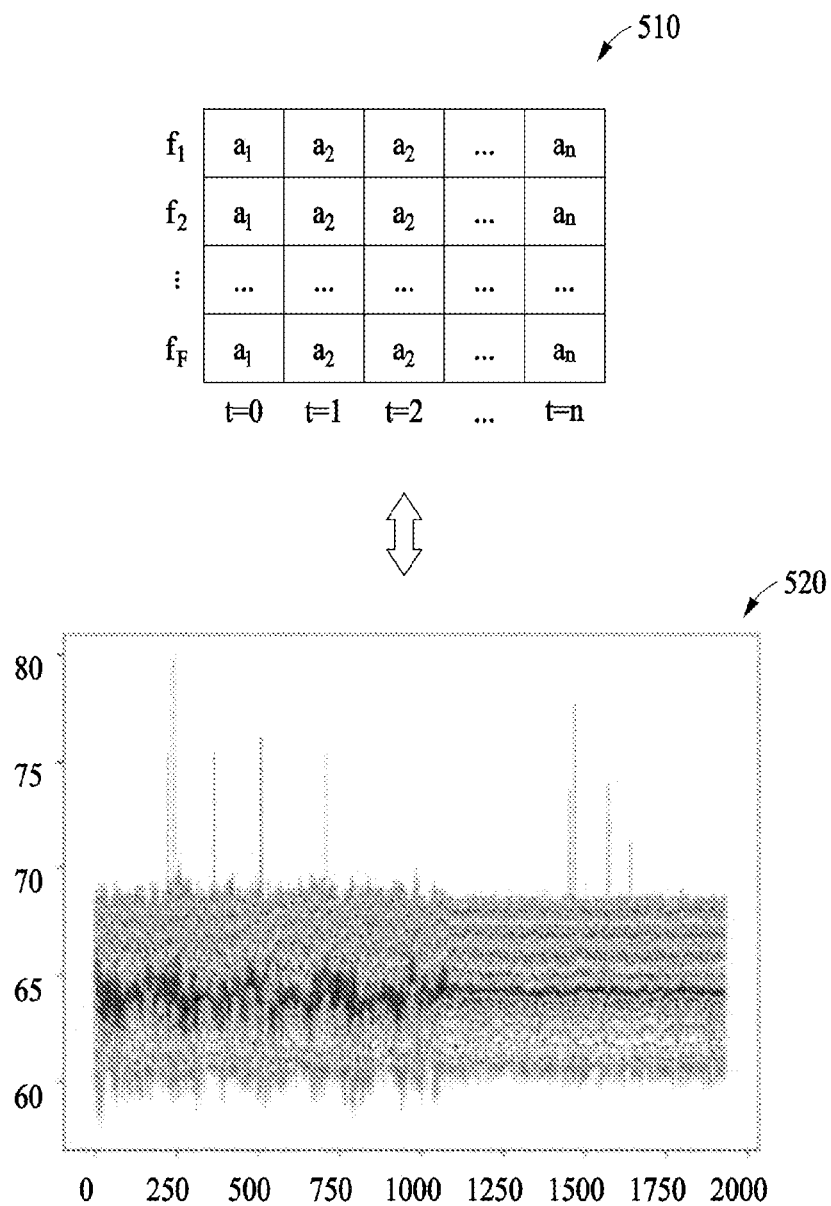
FIG. 5 is a diagram illustrating example amplitude data based on multipath channel characteristic data according to various embodiments.

FIG. 5 is a diagram illustrating example amplitude data based on multipath channel characteristic data according to various embodiments. The amplitude data may represent an amplitude for a frequency at each reference time. A display device (for example, the display device 110, the display device 900, and the display device 1000) may retrieve the multipath channel characteristic data at each reference time, and may generate the amplitude data by extracting an amplitude for each frequency from the multipath channel characteristic data. The amplitude data may have a data structure as shown in Table 510. $f_i$ may denote a frequency of a subcarrier having an index i, n may denote a size of a window for calculating a similarity, and a may denote an amplitude. i may have a value between 1 to F. F may denote a total number of subcarriers. t may denote a reference time. For example, a1 may denote an amplitude of multipath channel characteristic data retrieved at a reference time t=0. The amplitude data may be represented by graph 520. In graph 520, the horizontal axis may represent time and the vertical axis may represent amplitude. In graph 520, each frequency may be discriminated from another by color.

Figure 6:
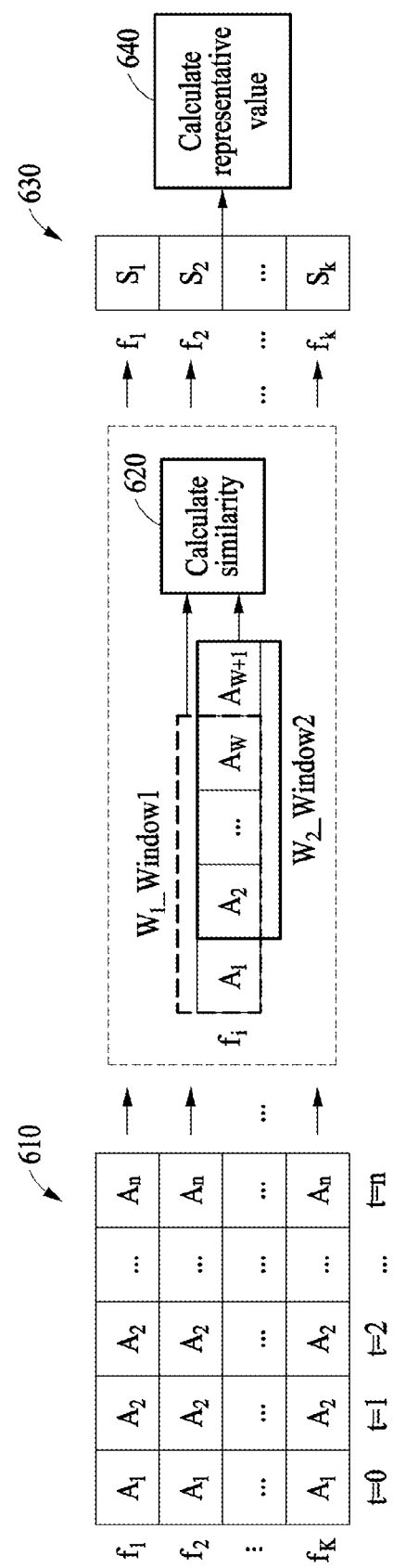
FIG. 6 is a diagram illustrating an example operation of deriving representative similarity values, according to various embodiments.

FIG. 6 is a diagram illustrating an example operation of deriving representative similarity values, according to various embodiments. Referring to FIG. 6, similarity values 630 may be derived by operation 620 of calculating a similarity based on amplitude data 610. In the amplitude data 610, A may denote an amplitude and k may denote a total number of subcarriers. The amplitude data 610 may correspond to a result of preprocessing, and in case a data gap is removed through preprocessing, k may be less than F. As described above with reference to FIG. 5, F may denote a total number of subcarriers before preprocessing.

The similarity values 630 of each frequency with respect to a W+1-th reference time may be derived by performing operation 620 on each of the frequencies of the amplitude data 610 at the W+1-th reference time. Each frequency may be represented by $f_i$. i may have a value between 1 to k. For an i-th amplitude data of $f_i$, a first window $W_1$ and a second window $W_2$ may be defined, and an i-th similarity value $S_i$ may be determined through operation 620 between amplitude data $A_1$ to $A_W$ of the first window $W_1$ and amplitude data $A_2$ to $A_{W+1}$ of the second window $W_2$.

As described with reference to FIG. 5, n may denote a size of a window for operation 620. When n+1 times of data retrieval have performed before operation 620, amplitude data $A_1$ to $A_n$ of $f_i$ may configure the amplitude data $A_1$ to $A_W$ of the first window $W_1$, and amplitude data $A_2$ to $A_{n+1}$ may configure the amplitude data $A_2$ to $A_{W+1}$ of the second window $W_2$. By performing operation 620 between the amplitude data $A_1$ to $A_W$ of $f_i$ and the amplitude data $A_2$ to $A_{W+1}$ of $f_i$, the i-th similarity value $S_i$ at the W+1-th reference time may be determined.

As the first similarity value $S_1$ at the W+1-th reference time to a k-th similarity value $S_k$ at the W+1-th reference time are determined, operation 640 of calculating a representative value may be performed based on a statistical value of the similarity values $S_1$ to $S_k$. For example, based on an average value of the similarity values $S_1$ to $S_k$ at the W+1-th reference time, a representative similarity value at the W+1-th reference time may be determined. Through the operations, a representative similarity value for each reference time may be determined.

Figure 7:
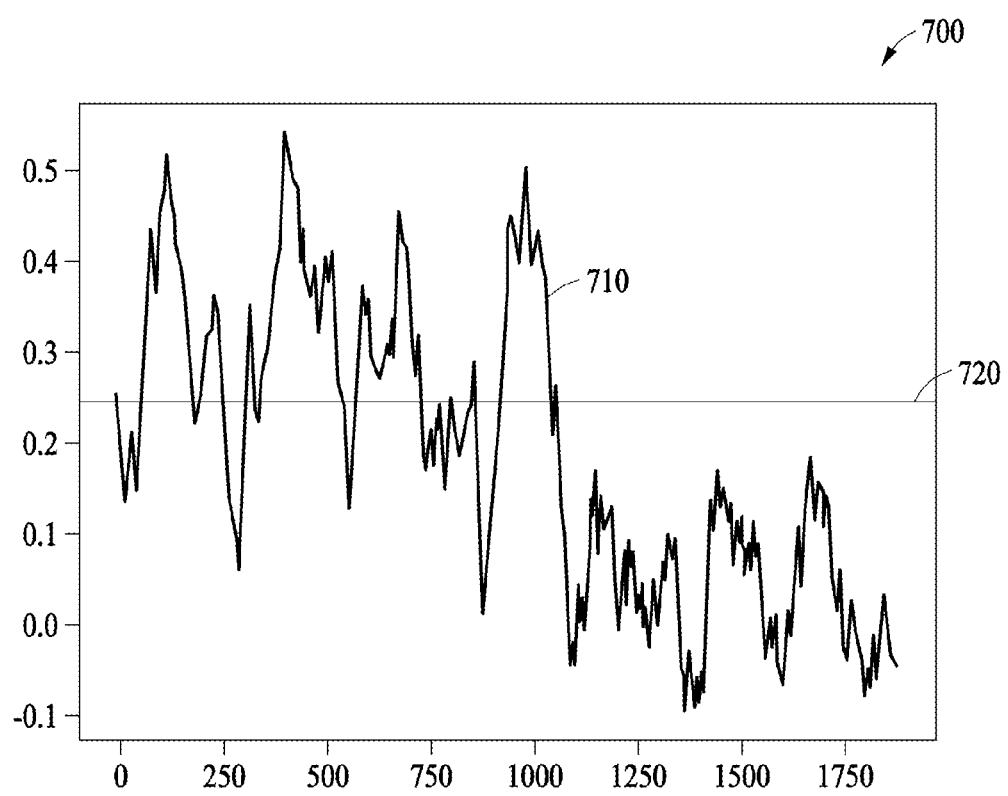
FIG. 7 is a graph illustrating an example operation of measuring a motion, according to various embodiments.

FIG. 7 is a graph illustrating an example operation of measuring a motion, according to various embodiments. Referring to FIG. 7, representative similarity values 710 and a threshold 720 are shown on graph 700. In graph 700, the horizontal axis may represent time and the vertical axis may represent a similarity value. The representative similarity values 710 may vary over time. A motion around a display device (for example, the display device 110, the display device 900, and the display device 1000) may change a pattern of multipath channel characteristic data, and the representative similarity values 710 may increase thereby. The display device may measure the motion based on a comparison result between the representative similarity values 710 and the threshold 720. For example, the display device may determine that there is a motion in a period in which the representative similarity values 710 are greater than the threshold 720, and may determine that there is no motion in a period in which the representative similarity values 710 are less than the threshold 720. Since the threshold 720 may represent different characteristics based on a use environment and situation of a wireless router (for example, the wireless router 130) and the display device, the display device may adaptively adjust the threshold 720 based on the use environment and the situation.

Figure 8:
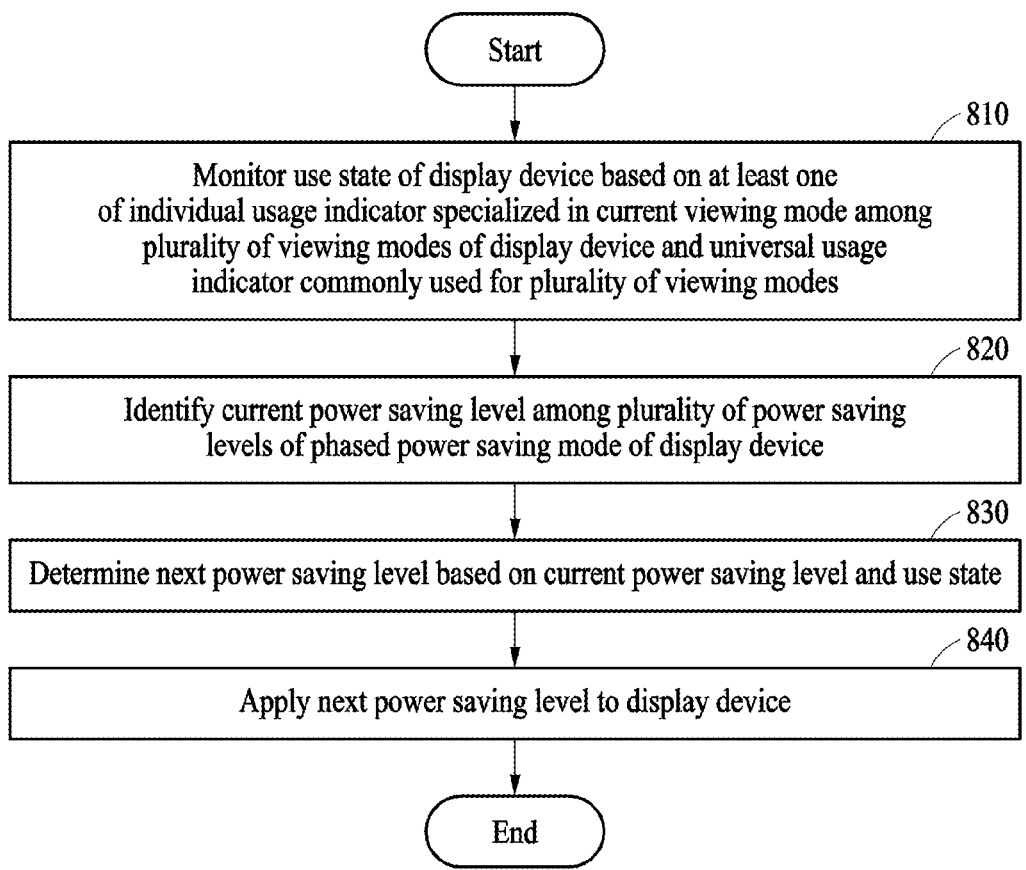
FIG. 8 is a flowchart illustrating an example method of controlling a display device, according to various embodiments.

FIG. 8 is a flowchart illustrating an example method of controlling a display device, according to various embodiments. Operations 810 to 840 of FIG. 8 may be performed sequentially or non-sequentially. For example, the order of operations 810 to 840 may be changed, and/or at least two of operations 810 to 840 may be performed in parallel. Operations 810 to 840 may be performed by at least one component (for example, a processor 930 and a processor 1030) of a display device (for example, the display device 110, the display device 900, and the display device 1000).

Referring to FIG. 8, in operation 810, the display device may monitor a use state of the display device, based on at least one of an individual usage indicator specialized for a current viewing mode among a plurality of viewing modes of the display device, and a universal usage indicator commonly used for the plurality of viewing modes.

The plurality of viewing modes may include a first viewing mode using a remote controller of the display device and a second viewing mode using a remote controller of an external multimedia device (for example, the external multimedia device 120) that provides multimedia content to the display device. Operation 810 may include an operation of monitoring the use state using a first individual usage indicator using a signal of the remote controller of the display device when the current viewing mode is the first viewing mode, and an operation of monitoring the use state using a second individual usage indicator using a signal of the remote controller of the external multimedia device when the current viewing mode is the second viewing mode.

The universal usage indicator may include at least one of sound around the display device, a display status of a menu of the display device, and a channel status between the display device and a wireless router. Operation 810 may include an operation of monitoring the use state, based on a maintenance time, of a state in which the same menu keeps being displayed, where the maintenance time is calculated by analyzing a screen of the display device. Operation 810 may include an operation of retrieving the multipath channel characteristic data based on a wireless signal of the wireless router, an operation of determining similarity values for each reference time by calculating a similarity for each time period of the multipath channel characteristic data, and an operation of monitoring a use state, based on a change in the similarity values over time.

In operation 820, the display device may identify a current power saving level among a plurality of power saving levels of a phased power saving mode of the display device. The plurality of power saving levels may include a first power saving level applying a lower screen brightness, compared to the normal mode, a second power saving level turning off a screen only, a third power saving level turning off both the screen and sound, and a fourth power saving level shutting off the power.

In operation 830, the display device may determine a next power saving level based on the use state of the display device and the current power saving level. Operation 830 may include an operation of determining the next power saving level to be one level higher than the current power saving level when use by the user is not detected for a predetermined time, and an operation of releasing the power saving mode and entering the normal mode regardless of a level of the current power saving level when the use by the user is detected. Among the plurality of power saving levels, as the level increases, less power may be consumed. The display device may display a message related to the determined next power saving level. In operation 840, the display device may apply the next power saving level to the display device.

Figure 9:
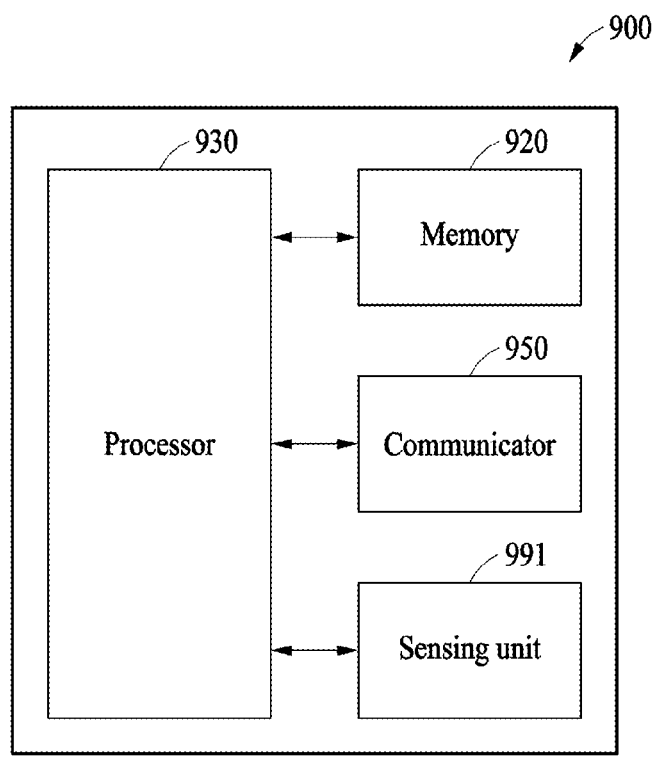
FIGS. 9 and 10 are block diagrams illustrating example configurations of display devices according to various embodiments.
Figure 10:
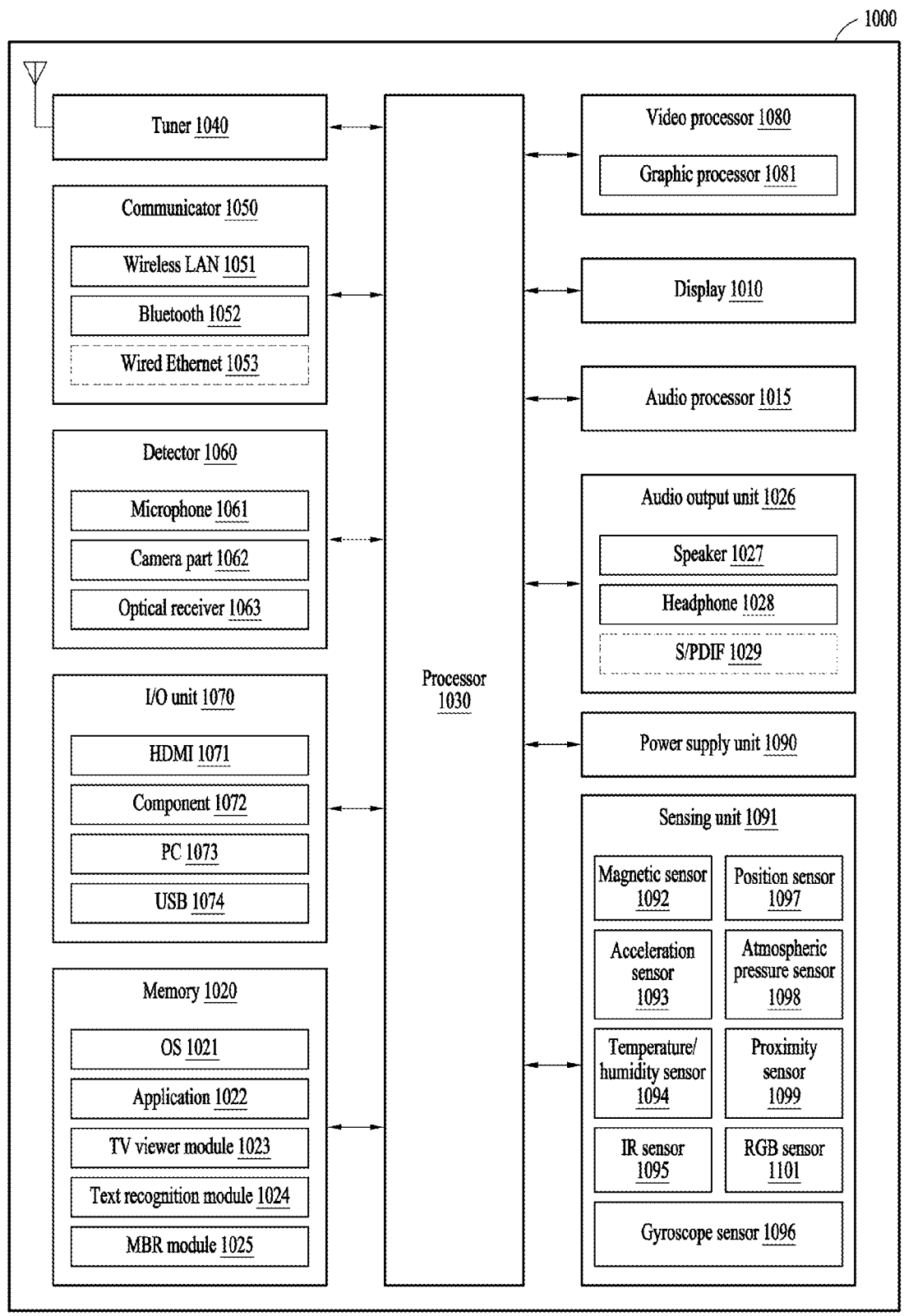

FIGS. 9 and 10 are block diagrams illustrating example configurations of display devices according to various embodiments. As shown in FIG. 9, the display device 900 may include a memory 920, the processor (e.g., including processing circuitry) 930, a communicator (e.g., including communication circuitry) 950, and a sensing unit (e.g., including at least one sensor) 991. According to various embodiments, the processor 930 may include various processing circuitry and be configured to monitor a use state of the display device 900, based on at least one of an individual usage indicator specialized for a current viewing mode among a plurality of viewing modes of the display device 900, and a universal usage indicator commonly used for the plurality of viewing modes, identify a current power saving level among a plurality of power saving levels of a phased power saving mode of the display device 900, determine a next power saving level based on the use state and the current power saving level, and apply the next power saving level to the display device 900.

The plurality of viewing modes may include a first viewing mode using a remote controller of the display device 900, and a second viewing mode using a remote controller of an external multimedia device (for example, the external multimedia device 120) that provides multimedia content to the display device 900. The processor 930 may monitor the use state using a first individual usage indicator using a signal of the remote controller of the display device 900 when the current viewing mode is the first viewing mode, and may monitor the use state using a second individual usage indicator using a signal of the remote controller of the external multimedia device when the current viewing mode is the second viewing mode.

The universal usage indicator may include at least one of sound around the display device 900, a display status of a menu of the display device 900, and a channel status between the display device 900 and a wireless router. The processor 930 may monitor the use state based on a maintenance time of a state in which the same menu keeps being displayed, where the maintenance time is calculated by analyzing a screen of the display device 900. The processor 930 may retrieve the multipath channel characteristic data based on a wireless signal of the wireless router, may determine similarity values for each reference time by calculating a similarity for each time period of the multipath channel characteristic data, and may monitor a use state based on a change in the similarity values over time.

The plurality of power saving levels may include a first power saving level applying a lower screen brightness compared to the normal mode, a second power saving level turning off a screen only, a third power saving level turning off both the screen and sound, and a fourth power saving level shutting off the power. For the plurality of power saving levels, as the level increases, less power may be consumed, and the processor 930 may determine the next power saving level to be one level higher than the current power saving level when use by the user is not detected for a predetermined time, and may release the power saving mode and entering the normal mode regardless of a level of the current power saving level when the use by the user is detected. The processor 930 may display a notification message related to the determined next power saving level.

According to various embodiments, the processor 930 may be configured to monitor a use state of the display device 900, based on at least one of an individual usage indicator specialized for a current viewing mode among a plurality of viewing modes of the display device 900, and a universal usage indicator commonly used for the plurality of viewing modes, identify a current power saving level among a plurality of power saving levels of a phased power saving mode of the display device 900, determine a next power saving level to be one level higher than the current power saving level when use by the user is not detected for a predetermined time, and apply the next power saving level to the display device 900. Among the plurality of power saving levels, as the level increases, less power may be consumed.

Not all components shown in FIG. 9 are essential components. The display device 900 may be implemented by more components than the illustrated components, and the display device 900 may be implemented by less components.

For example, as shown in FIG. 10, the display device 1000 may include a display 1010, a tuner 1040, a detector (e.g., including detecting circuitry) 1060, an input/output (I/O) unit (e.g., including input/output circuitry) 1070, a video processor (e.g., including video processing circuitry) 1080, an audio processor (e.g., including audio processing circuitry) 1015, an audio output unit (e.g., including audio output circuitry) 1026, and a power supply unit (e.g., including a power supply) 1090 as well as a memory 1020, the processor (e.g., including processing circuitry) 1030, a communicator (e.g., including communication circuitry) 1050, and a sensing unit (e.g., including at least one sensor) 1091.

Hereinafter, the components stated above are described.

The processor 1030 may include various processing circuitry and control overall operations of the display device 1000 and a flow of a signal between internal components of the display device 1000, and may process data. The processor 1030 may execute various applications and an operation system (OS) stored in the memory 1020 in response to a user input or when a preset and stored condition is satisfied.

The processor 1030 may include random access memory (RAM) configured to store data or a signal input by the outside the display device 1000 or configured to be used as a storage corresponding to various tasks performed by the display device 1000, read-only memory (ROM) that stores a control program to control the display device 1000, and a processor.

The processor 1030 may include a graphics processing unit (GPU) (not shown) to process a graphic corresponding to a video. The processor 1030 may be implemented as a System on Chip (SoC) that integrates a core (not shown) and the GPU (not shown). The processor 1030 may include a single core, a dual core, a triple core, a quad core, and a multi core.

The processor 1030 may include a plurality of processors. For example, the processor may be implemented as a main processor (not shown) and a sub-processor (not shown) that operates in a sleep mode.

The processor 1030 may detect at least one sensed value corresponding to at least one sensor through the sensing unit 1091 including at least one sensor, by executing one or more instructions stored in the memory 1020.

The memory 1020 may store various pieces data, a program, or an application for driving and controlling the display device 1000 under control by the processor 1030. The memory 1020 may store data or input/output signals corresponding to driving of the video processor 1080, the display 1010, the audio processor 1015, the audio output unit 1026, the power supply unit 1090, the tuner 1040, the communicator 1050, the detector 1060, and the I/O unit 1070.

The memory 1020 may store an operating system 1021 for controlling the display device 1000 and the processor 1030, an application 1022 initially provided by a manufacturer or externally downloaded, a graphical user interface (GUI) related to the application, an object (for example, an image, text, an icon, a button, and the like) for providing the GUI, user information, a document, a database, and related data.

In addition, the memory 1020 may include a television (TV) viewer module 1023 including one or more instructions to receive an input signal from a remote control device (not shown) and thereby perform channel control corresponding to the input signal, or enter a channel scroll user interface mode when the input signal corresponds to a preset input, a text recognition module 1024 including one or more instructions to recognize information from content received from an external device (not shown), and a membrane bioreactor (MBR) module 1025 including one or more instructions to control a channel from an external device (not shown).

The memory 1020 may include ROM, RAM, a memory card (for example, a micro secure digital (SD) card and a universal serial bus (USB) memory, which are not shown) mounted to the display device 1000. In addition, the memory 1020 may include non-volatile memory, volatile memory, a hard disk drive (HDD), or a solid state drive (SSD).

The memory 1020 may include at least one type of storage media of a flash memory type, a hard disk type, a multimedia card micro type, a card memory type (for example, SD or extreme digital (XE) memory), RAM, static RAM, ROM, electrically erasable programmable ROM (EEPROM), programmable ROM (PROM), magnetic memory, a magnetic disk, and an optical disk.

The display 1010 may display a video included in a broadcast signal received through the tuner 1040 on a screen under control by the processor 1030. In addition, the display 1010 may display content (for example, a moving image) input through the communicator 1050 or the I/O unit 1070. The display 1010 may output an image stored in the memory 1020 under control by the processor 1030.

The display 1010 may generate a driving signal by converting an image signal, a data signal, an on-screen display (OSD) signal, and a control signal processed by the processor 1030. The display 1010 may be implemented, for example, and without limitation, as a plasma display panel (PDP), a liquid crystal display (LCD), an organic light-emitting diode (OLED), a cathode ray tube (CRT), a flexible display, or the like, and in addition, the display 1010 may be implemented as a 3D display. In addition, the display 1010 may be used as an input device as well as an output device by being configured as a touchscreen.

The tuner 1040 may tune and select a frequency of a channel desired to be received by the display device 1000 among various radio wave elements through performing amplification, mixing, and resonance on a broadcast signal that is received by wire or wirelessly. The broadcast signal may include audio, a video, and additional information (for example, an electronic program guide (EPG)).

The tuner 1040 may receive the broadcast signal from a frequency band corresponding to a channel number according to a user input (for example, a control signal received from a remote control device (not shown), that is, a channel number input, an up-down input of a channel, and a channel input on an EPG screen).

The tuner 1040 may receive broadcast signals from various sources, such as terrestrial broadcast, cable broadcast, satellite broadcast, and Internet broadcast. The tuner 1040 may receive the broadcast signal from a source, such as analog broadcast or digital broadcast. The broadcast signal received by the tuner 1040 may be separated into audio, video, and/or additional information by decoding (for example, audio decoding, video decoding, or additional information decoding). The separated audio, video, and/or additional information may be stored in the memory 1020 under control by the processor 1030.

One or a plurality of tuners 1040 of the display device 1000 may be provided. The tuner 1040 may be implemented as all-in-one with the display device 1000, or implemented as a separate device (for example, a set-top box, which is not shown, and a tuner, which is not shown, connected to the I/O unit 1070) that includes a tuner electrically connected to the display device 1000.

The communicator 1050 may include various communication circuitry and connect the display device 1000 to an external device (for example, an audio device) (not shown) under control by the processor 1030. The processor 1030 may transmit/receive content to/from the external device (not shown) connected through the communicator 1050, may download an application from an external device (not shown), or may perform web browsing. The communicator 1050 may include one of a wireless local area network (LAN) 1051, Bluetooth 1052, and wired Ethernet 1053 corresponding to the performance and the structure of the display device 1000. In addition, the communicator 1050 may include a combination of the wireless LAN 1051, Bluetooth 1052, and the wired Ethernet 1053.

In addition, the communicator 1050 may receive a control signal of a remote control device (not shown) under control by the processor 1030. The control signal may be implemented as a Bluetooth type, a radio frequency (RF) signal type, or a Wi-Fi type.

In addition, the communicator 1050 may further include another form of local area communication (for example, near field communication (NFC), which is not shown, and Bluetooth low energy (BLE), which is not shown) other than Bluetooth.

The detector 1060 may include various detection circuitry and detect voice, an image, or an interaction of a user, and may include a microphone 1061, a camera part 1062, and an optical receiver 1063.

The microphone 1061 may receive an uttered voice of the user. The microphone 1061 may convert the received voice into an electrical signal and may output the electrical signal to the processor 1030. The user voice may include, for example, voice corresponding to a menu or a function of the display device 1000.

The camera part 1062 may obtain an image bezel, such as a still image or a moving image. An image captured by an image sensor may be processed by the processor 1030 or a separate image processor (not shown).

The image bezel processed by the camera part 1062 may be stored in the memory 1020 or may be transmitted to the outside through the communicator 1050. Two or more camera parts 1062 may be provided based on the configuration of the display device 1000.

The optical receiver 1063 may receive an optical signal (including a control signal) received from an external remote control device (not shown). The optical receiver 1063 may receive an optical signal corresponding to a user input (for example, a touch, a press, a touch gesture, a voice, or a motion) from a remote control device (not shown). A control signal may be extracted from the received optical signal under control by the processor 1030. For example, the optical receiver 1063 may receive a control signal corresponding to a channel up/down button for changing a channel, from the remote control device (not shown).

The I/O unit 1070 may include various input/output circuitry and receive video (for example, a moving image), audio (for example, voice, music), and additional information (for example, an EPG) from the outside of the display device 1000 under control by the processor 1030. The I/O unit 1070 may include at least one of an HDMI port 1071, a component jack 1072, a PC port 1073, and a USB port 1074. The I/O unit 1070 may include any combination of the HDMI port 1071, the component jack 1072, the PC port 1073, and the USB port 1074. An external image providing device (not shown) may be connected through the HDMI port 1071.

The video processor 1080 may include various video processing circuitry and process video data received by the display device 1000. In the video processor 1080, various image processing may be performed on video data, such as decoding, scaling, noise filtering, bezel rate conversion, and resolution conversion.

A graphic processor 1081 may generate a screen including various objects, such as an icon, an image, and text using an arithmetic unit (not shown) and a renderer (not shown). The arithmetic unit (not shown) may calculate an attribute value, such as a color, a size, a shape, a coordinate value, to display each object based on a layout of a screen using a user input that is detected by the detector 1060. The renderer (not shown) may generate screens in various layouts including an object, based on the attribute value calculated by the arithmetic unit (not shown). The screen generated by the renderer (not shown) may be displayed on a display area of the display 1010.

The audio processor 1015 may include various audio processing circuitry and process audio data. The audio processor 1015 may perform various processing on the audio data, such as decoding, amplification, and noise filtering. Meanwhile, the audio processor 1015 may include a plurality of audio processing modules to process audio corresponding to a plurality of contents.

The audio output unit 1026 may include various audio output circuitry and output audio included in the broadcast signal received through the tuner 1040 under control by the processor 1030. The audio output unit 1026 may output audio (for example, voice, sound) input through the communicator 1050 or I/O unit 1070. In addition, the audio output unit 1026 may output audio stored in the memory 1020 under control by the processor 1030. The audio output unit 1026 may include at least one of a speaker 1027, a headphone output terminal 1028, or a Sony/Philips digital interface (S/PDIF) output terminal 1029. The audio output unit 1026 may include any combination of the speaker 1027, the headphone output terminal 1028, and the S/PDIF output terminal 1029.

The power supply unit 1090 may include a power supply and supply power input from an external power source to the components inside the display device 1000 under control by the processor 1030. In addition, the power supply unit 1090 may supply power output from one or more batteries (not shown) placed inside the display device 1000 to the components inside the display device 1000 under control by the processor 1030.

The sensing unit 1091 may include at least one sensor and sense a state of the display device 1000 or a state around the display device 1000, and may provide the information obtained by sensing to the processor 1030.

The sensing unit 1091 may include at least one of a magnetic sensor 1092, an acceleration sensor 1093, a temperature/humidity sensor 1094, an IR sensor 1095, a gyroscope sensor 1096, a position sensor (for example, global positioning system (GPS)) 1097, an atmospheric pressure sensor 1098, a proximity sensor 1099, and an RGB sensor 1101 (for example, an illuminance sensor), however, the example is not limited thereto. Since one skilled in the art may intuitively infer a function of each sensor from its name, a detailed description thereof is omitted.

The sensing unit 1091 may sense an external impact applied to the display device 1000.

In addition, a separate external device (for example, a set-top box, which is not shown) including the tuner 1040 may be electrically connected to the display device 1000 including the display 1010.

In addition, the display device 1000 may be implemented as an analog TV, a digital TV, a 3D-TV, a smart TV, an LED TV, an OLED TV, a plasma TV, and a monitor, however, one skilled in the art will understand that the examples are not limited thereto.

Moreover, the illustrated block diagram of the display device 1000 is a block diagram of an example embodiment. Each component of the block diagram may be integrated, added, or omitted based on actually implemented specifications of the display device 1000. That is, two or more components may be combined into one component, or one component may be divided into two or more components, as necessary. In addition, a function performed by each block is for describing example embodiments, and a detailed operation thereof or a device does not limit the scope of the present disclosure.

It should be understood that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (for example, the OS 1021, the application 1022) including one or more instructions that are stored in a storage medium (for example, the memory 920, the memory 1020) that is readable by a machine (for example, the display device 110, the display device 900, and the display device 1000). For example, a processor (for example, the processor 930, the processor 1030) of the machine (for example, the display device 110, the display device 900, and the display device 1000) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display device comprising:
   a memory comprising one or more executable instructions; and
   at least one processor comprising processing circuitry, the at least one processor, individually and/or collectively, configured to:
   monitor a use state of the display device, wherein the use state is monitored using a first individual usage indicator and a universal usage indicator based on a current viewing mode corresponding to a first viewing mode among a plurality of viewing modes of the display device, and the use state is monitored using a second individual usage indicator, different from the first individual usage indicator, and the universal usage indicator based on the current viewing mode corresponding to a second viewing mode among the plurality of viewing modes,
   identify a current power saving level among a plurality of power saving levels of a phased power saving mode of the display device,
   determine a next power saving level based on the use state and the current power saving level, and
   apply the next power saving level to the display device,
   wherein the first individual usage indicator is configured for the first viewing mode and uses a signal of a first remote controller detected by the display device and configured to control the display device, the second individual usage indicator is configured for the second viewing mode and uses a signal of a second remote controller detected by the display device and configured to control an external multimedia device configured to provide multimedia content to the display device, the first remote controller is used in the first viewing mode, and the second remote controller is used in the second viewing mode.

2. The display device of claim 1, wherein the use state is monitored using universal usage based on the current viewing mode not corresponding to the first viewing mode and not corresponding to the second view mode.

3. The display device of claim 1, wherein the universal usage indicator comprises: sound around the display device and a display status of a menu of the display device.

4. The display device of claim 1, wherein the universal usage indicator comprises: at least one of sound around the display device, a display status of a menu of the display device, and a channel status between the display device and a wireless router.

5. The display device of claim 1, wherein the at least one processor, individually and/or collectively, is configured to monitor the use state based on a maintenance time of a state in which a same menu continues to be displayed, wherein the maintenance time is calculated by analyzing a screen of the display device.

6. The display device of claim 1, wherein the at least one processor, individually and/or collectively, is configured to:
   retrieve multipath channel characteristic data based on a wireless signal of a wireless router,
   determine similarity values for each reference time by calculating a similarity for each time period of the multipath channel characteristic data, and
   monitor the use state based on a change in the similarity values over time.

7. The display device of claim 1, wherein the plurality of power saving levels comprises:
   a first power saving level configured to apply lower screen brightness, compared to a normal mode;
   a second power saving level configured to turn off a screen between the screen and sound;
   a third power saving level configured to turn off both the screen and the sound; and
   a fourth power saving level configured to turn off power.

8. The display device of claim 1, wherein, among the plurality of power saving levels, as the level increases, less power is consumed, and
   the at least one processor is, individually and/or collectively, configured to:
   determine the next power saving level to be one level higher the current power saving level based on use by the user not being detected for a specified time, based on the use state, and
   release the phased power saving mode and enter a normal mode regardless of a level of the current power saving level based on the use by the user being detected based on the use state.

9. The display device of claim 1, wherein the at least one processor, individually and/or collectively, is further configured to display a notification message related to the determined next power saving level.

10. A display device comprising:
a memory comprising one or more executable instructions; and
at least one processor comprising processing circuitry, the at least one processor, individually and/or collectively, configured to:
monitor a use state of the display device, wherein the use state is monitored using a first individual usage indicator and a universal usage indicator based on a current viewing mode corresponding to a first viewing mode among a plurality of viewing modes of the display device, and the use state is monitored using a signal of a second individual usage indicator, different from the first individual usage indicator, and the universal usage indicator based on the current viewing mode corresponding to a second viewing mode among the plurality of viewing modes,
identify a current power saving level among a plurality of power saving levels of a phased power saving mode of the display device,
determine a next power saving level to be one level higher than the current power saving level based on use not being detected for a predetermined time, based on the use state, and
apply the next power saving level to the display device,
wherein the first individual usage indicator is configured for the first viewing mode and uses a signal of a first remote controller detected by the display device and configured to control the display device, the second individual usage indicator is configured for the second viewing mode and uses a signal of a second remote controller detected by the display device and configured to control an external multimedia device configured to provide multimedia content to the display device, and
wherein, among the plurality of power saving levels, as the level increases, less power is consumed, the first remote controller is used in the first viewing mode, and the second remote controller is used in the second viewing mode.

11. The display device of claim 10, wherein the at least one processor, individually and/or collectively, is configured to release the power saving mode and enter a normal mode regardless of a level of the current power saving level based on the use being detected based on the use state.

12. A method of controlling a display device, the method comprising:
monitoring a use state of the display device, wherein the use state is monitored using a first individual usage indicator and a universal usage indicator based on a current viewing mode corresponding to a first viewing mode among a plurality of viewing modes of the display device, and the use state is monitored using a second individual usage indicator, different from the first individual usage indicator, and the universal usage indicator based on the current viewing mode corresponding to a second viewing mode among the plurality of viewing modes;
identifying a current power saving level among a plurality of power saving levels of a phased power saving mode of the display device;
determining a next power saving level based on the use state and the current power saving level; and
applying the next power saving level to the display device,
wherein the first individual usage indicator is configured for the first viewing mode and uses a signal of a first remote controller detected by the display device and configured to control the display device, the second individual usage indicator is configured for the second viewing mode and uses a signal of a second remote controller detected by the display device and configured to control an external multimedia device configured to provide multimedia content to the display device, the first remote controller is used in the first viewing mode, and the second remote controller is used in the second viewing mode.

13. The method of claim 12, wherein the use state is monitored using universal usage based on the current viewing mode not corresponding to the first viewing mode and not corresponding to the second view mode.

14. The method of claim 12, wherein the universal usage indicator comprises at least one of sound around the display device, a display status of a menu of the display device, and a channel status between the display device and a wireless router.

15. The method of claim 12, wherein the monitoring of the use state comprises monitoring the use state based on a maintenance time of a state in which a same menu continues to be displayed, wherein the maintenance time is calculated by analyzing a screen of the display device.

16. The method of claim 12, wherein the monitoring of the use state comprises:
retrieving multipath channel characteristic data based on a wireless signal of a wireless router;
determining similarity values for each reference time by calculating a similarity for each time period of the multipath channel characteristic data; and
monitoring the use state based on a change in the similarity values over time.

17. The method of claim 12, wherein the plurality of power saving levels comprises:
a first power saving level configured to apply lower screen brightness compared to a normal mode;
a second power saving level configured to turn off a screen between the screen and sound;
a third power saving level configured to turn off both the screen and the sound; and
a fourth power saving level configured to turn off power.

18. The method of claim 12, wherein, among the plurality of power saving levels, as the level increases, less power is consumed, and
the determining of the next power saving level comprises:
determining the next power saving level to be one level higher the current power saving level based on use not being detected for a specified time, based on the use state; and
releasing the power saving mode and entering a normal mode regardless of a level of the current power saving level based on the use being detected based on the use state.

19. The method of claim 12, further comprising:
displaying a notification message related to the determined next power saving level.

20. A non-transitory computer-readable storage medium storing instructions that, when executed by a processor, cause the processor to perform the operations of claim 12.

* * * * *